United States Patent
Bjelcevic et al.

(10) Patent No.: US 12,541,752 B2
(45) Date of Patent: Feb. 3, 2026

(54) APPARATUS AND TECHNIQUES OF IMAGE COLLECTION FOR VISION CHECKOUT

(71) Applicant: NCR Voyix Corporation, Atlanta, GA (US)

(72) Inventors: Stefan Bjelcevic, Roswell, GA (US); Hunter Blake Wilson Germundsen, Atlanta, GA (US); Catherine Lee, Atlanta, GA (US); Christian Lee McDaniel, Atlanta, GA (US); Brent Vance Zucker, Roswell, GA (US)

(73) Assignee: NCR Voyix Corporation, Atlanta, GA (US)

( * ) Notice: Subject to any disclaimer, the term of this patent is extended or adjusted under 35 U.S.C. 154(b) by 951 days.

(21) Appl. No.: 17/733,099

(22) Filed: Apr. 29, 2022

(65) Prior Publication Data

US 2023/0252444 A1    Aug. 10, 2023

Related U.S. Application Data

(63) Continuation-in-part of application No. 17/665,145, filed on Feb. 4, 2022.

(51) Int. Cl.
*G06V 10/12* (2022.01)
*G06Q 20/20* (2012.01)
(Continued)

(52) U.S. Cl.
CPC ............ *G06Q 20/208* (2013.01); *G06V 10/12* (2022.01); *G06V 10/764* (2022.01); *G06V 10/774* (2022.01)

(58) Field of Classification Search
CPC ...... G06V 10/82; G06V 10/12; G06V 10/255; G06V 10/774; G06V 10/16; G06V 10/764;
(Continued)

(56) References Cited

U.S. PATENT DOCUMENTS

| 11,481,751 B1 * | 10/2022 | Chaubard | .............. G06V 10/82 |
| 2018/0077401 A1 * | 3/2018 | Yahav | .................... H04N 23/56 |
| 2019/0108396 A1 | 4/2019 | Dal Mutto et al. | |

OTHER PUBLICATIONS

Wei XS, Cui Q, Yang L, Wang P, Liu L. RPC: A large-scale retail product checkout dataset. arXiv preprint arXiv:1901.07249. Jan. 22, 2019. (Year: 2019).*

(Continued)

*Primary Examiner* — Tracy Mangialaschi
(74) *Attorney, Agent, or Firm* — Schwegman Lundberg & Woessner, P.A.

(57) ABSTRACT

An apparatus is provided that executes instructions to move an item within a scan zone to specific X-Y coordinates of the scan zone. The item is placed on a platform and is rotated 360 degrees at each X-Y coordinate within the scan zone. Item images are captured by cameras at each X-Y coordinate and for each rotation at the corresponding X-Y coordinate. The item images are labeled and retained. The item images are used as input to a Machine-Learning Model (MLM) to train the MLM to recognize item codes for the items when subsequent images are captured for the item during a checkout. In an embodiment, during a checkout unknown item images are flagged and labeled with the corresponding item code when the corresponding item's barcode is scanned during the checkout; the labeled item images are also retailed for training the MLM for item recognition.

20 Claims, 4 Drawing Sheets

(51) Int. Cl.
*G06V 10/764* (2022.01)
*G06V 10/774* (2022.01)

(58) Field of Classification Search
CPC ...... G06V 20/52; G06V 20/64; G06Q 20/208; G07G 1/0063; G07G 1/0045
See application file for complete search history.

(56) References Cited

OTHER PUBLICATIONS

Feldmann, Mitchell J., and Amy Tabb. "Cost-effective, high-throughput phenotyping system for 3D reconstruction of fruit form." bioRxiv (2021): 2021-09. (Year: 2021).*
EP Examination Report dated Feb. 14, 2025.

* cited by examiner

APPARATUS AND TECHNIQUES OF IMAGE COLLECTION FOR VISION CHECKOUT

RELATED APPLICATIONS

The present application is Continuation-In-Part (CIP) of application Ser. No. 17/665,145 entitled "Multi-Item Product Recognition for Checkouts" filed on Feb. 4, 2022, the disclosure of which is incorporated in its entirety herein and below.

BACKGROUND

For vision self-checkout, that are Machine-Learning Models (MLMs) that require capturing a lot if images of items in various positions in a predefined transaction area (scan zone). Normally, the processor for collecting these image requires a human trainer to physically move an item around and capturing photos. The trainer places the item in a designated location and activates cameras to take images.

This process is tedious and takes an exorbitant amount of time to complete. The trainer needs to start a camera script that controls the cameras, position the item within the scan zone and press a button to capture the images taken by the cameras.

MLMs are more accurate based on large amounts of training images, with each image of each item representing a different position within the scan zone. So, just one item can take a long amount of time to complete. MLMs may need hundreds of images per item each image representing the item in a different location and/or position within the scan zone. A store typically has hundreds if not thousands of different items that they offer for sale. With the combination of how many images that needs to be taken for a single item, how many times each item needs to be physically moved around the scan zone, and how may times the image capture button must be pressed, this manual data collection process can take thousands of manual hours, which may be better spent on other tasks of the store.

SUMMARY

In various embodiments, a system, an apparatus, and a method of automated item image capture and registration for vision checkouts are presented.

According to an embodiment, a method of automated item image capture and registration for vision checkouts provided. Instructions are received for moving an item around X-Y coordinates within a scan zone. The item is moved to each of the X-Y coordinates based on the instructions. Multiple cameras are activated to capture item images of the item at each X-Y coordinate within the scan zone; the multiple cameras are positioned at different angles and at different locations around the scan zone from one another.

DETAILED DESCRIPTION

Figure 1A:
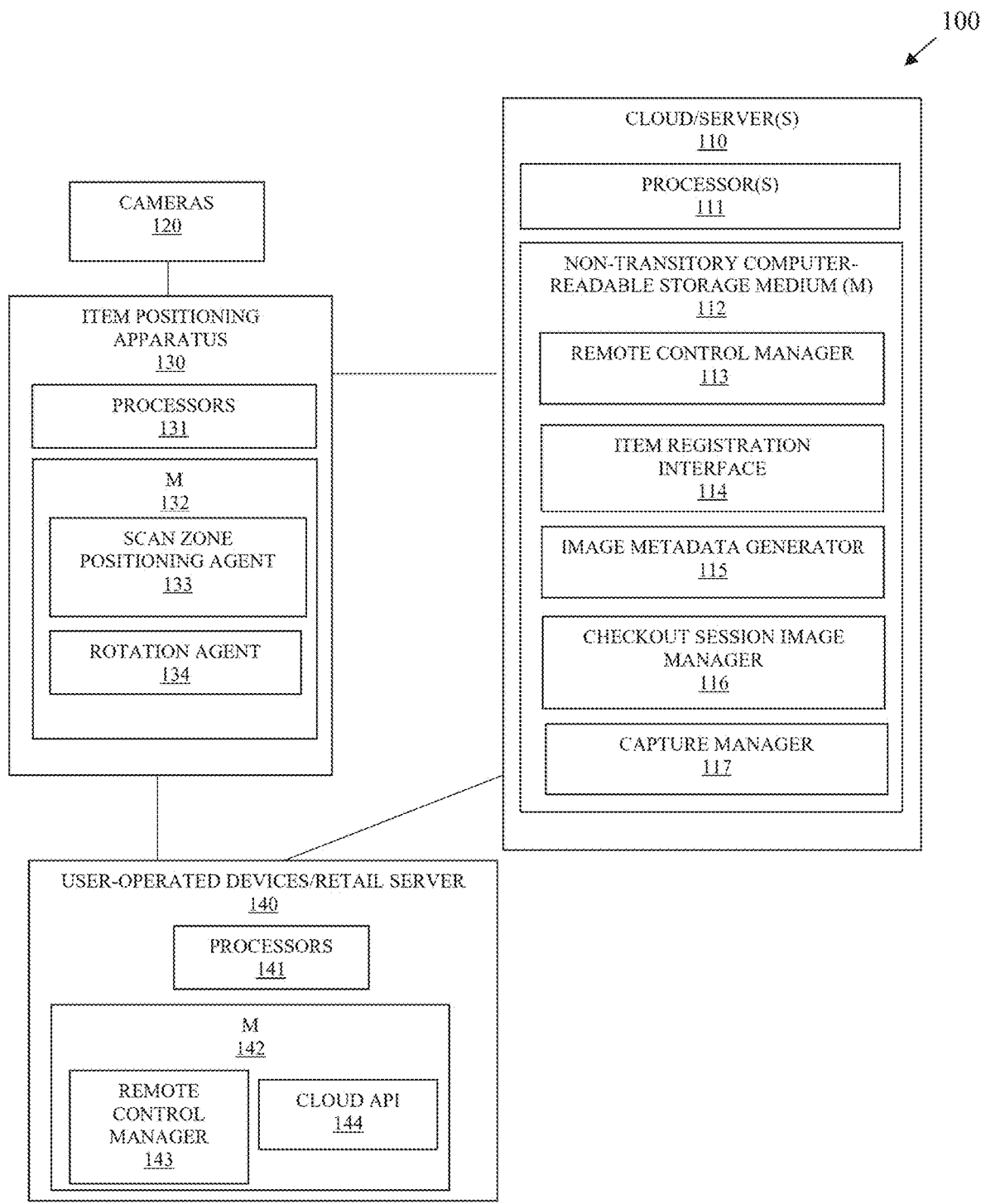
FIG. 1A is a diagram of a system of automated item image capture and registration for vision checkouts, according to an example embodiment.

FIG. 1A is a diagram of a system 100 of automated item image capture and registration for vision checkouts, according to an example embodiment. It is to be noted that the components are shown schematically in greatly simplified form, with only those components relevant to understanding of the embodiments being illustrated.

Furthermore, the various components (that are identified in system/platform 100) are illustrated and the arrangement of the components are presented for purposes of illustration only. It is to be noted that other arrangements with more or less components are possible without departing from the teachings of automated item image capture and registration for vision checkouts, presented herein and below.

As used herein a "scan zone" or "transaction area" may be used interchangeably and synonymously. These phrases refers to a predefined area where a set or multi-items of a customer are being monitored through multiple images taken at multiple different angles. Each image presents a "scene" of the scan zone. There are multiple images captured by multiple cameras of the scene at different angles and at different distances from the surfaces of the scan zone. The multi-items can be stationary (such as on a countertop of a transaction terminal) or the items can be moving with the customer in a basket, a cart, in their hands and arms, or in a bag. The area can be any predefined shape, predefined size, and predefined dimensions.

System 100 provides an apparatus and a processing technique by which a single item can be placed on a spiral component and a capture script initiated. The single item is rotated 360 degrees on the spiral component while linearly moved around x and y coordinates of the scan zone. At each x-y coordinate location within the scan zone, the cameras capture their images of the scene with the item at the x-y coordinate. The item stays at the x-y coordinate and rotated 360 degrees along the spiral component where more images are captured by the cameras. Thus, each angle for the item within 360 degrees at each x-y coordinate within scan zone captures multiple images from the multiple cameras. Metadata that identifies the item, the x and you coordinates and the degree of rotations for each image is maintained with each image captured. This process can be repeated for each item of a store. The only manual effort required is removing and placing an item on the spiral component and initiating the capture script.

In some cases, system 100 also permits images of items captured during checkouts where the barcode of the items are scanned to be labeled and stored. This is referred to "in the wild" image capture during checkout sessions with customers.

Various embodiments are now discussed in great detail with reference to FIG. 1A.

System 100 comprises a cloud/server 110, cameras 120, an item positioning apparatus 130, and a user-operated device and/or retail server 140.

Cloud/Server 110 comprises a processor 111 and a non-transitory computer-readable storage medium 112. Medium 112 comprises executable instructions for a remote-control manager 113, an item registration interface 114, an image metadata generator 115, checkout session image manager 117, and a capture manager 118. The executable instructions when provided or obtained by the processor 111 from medium 112 cause the processor 111 to perform operations discussed herein with respect to 113-118.

Camera 120 may be stationary cameras placed throughout a store, such as overhead cameras situated overhead of transaction areas of terminals 150 and/or situated along side countertops associated with terminals 150. Cameras may also be apparatus-affixed cameras 120 that are affixed to the sides of baskets and carts. One camera 120 for a cart or a basket may be placed along a top edge of the cart or basket and pointed down into the basket or cart. Other cameras 120 for the cart or basket may be affixed to 2 or more sides of the cart or basket focused into the cart or basket.

In an embodiment, cameras 130 are apparatus affixed and are used for the embodiments discussed below.

In an embodiment, cameras 120 are not apparatus affixed and are used for the embodiments discussed below.

In an embodiment, a combination of in-store cameras 120 and apparatus-affixed cameras 120 are used for the embodiments discussed below.

In an embodiment, 3 cameras 120 are used for the embodiments discussed below.

In an embodiment, 4 cameras 120 are used for the embodiments discussed below.

In an embodiment, 5 or more cameras 120 are used for the embodiments discussed below.

In an embodiment, one or all of the cameras 120 are depth cameras.

The item positioning apparatus 120 comprises a processor 131 and a non-transitory computer-readable storage medium 132. Medium 132 comprises executable instructions or firmware for moving electromechanical components according to preset or received instructions. The executable instructions or firmware comprise a scan zone positioning agent 133 and a rotation agent 134. The electromechanical components are discussed below with FIGS. 1B and 1B. The firmware or executable instructions when obtained by or provided to the processor 131 cause the processor 131 to perform the operations (movements of the electromechanical components) discussed below with respect to 133 and 134.

Each user-operated device and/or retail server 140 comprises at least one processor 141 and a non-transitory computer-readable storage medium 142. Medium 142 comprises executable instructions for a remote-control manager 143 and a cloud Application Programming Interface (API). The executable instructions when provided or obtained by the processor 141 from medium 142 cause the processor 141 to perform operations discussed herein with respect to 143 and 144.

The electromechanical components of apparatus 130 is now discussed with reference to FIGS. 1B and 1C along with operations of cloud/server 110, apparatus 130, and user-operated device and/or retail server 140 with reference to FIG. 1A.

Figure 1B:
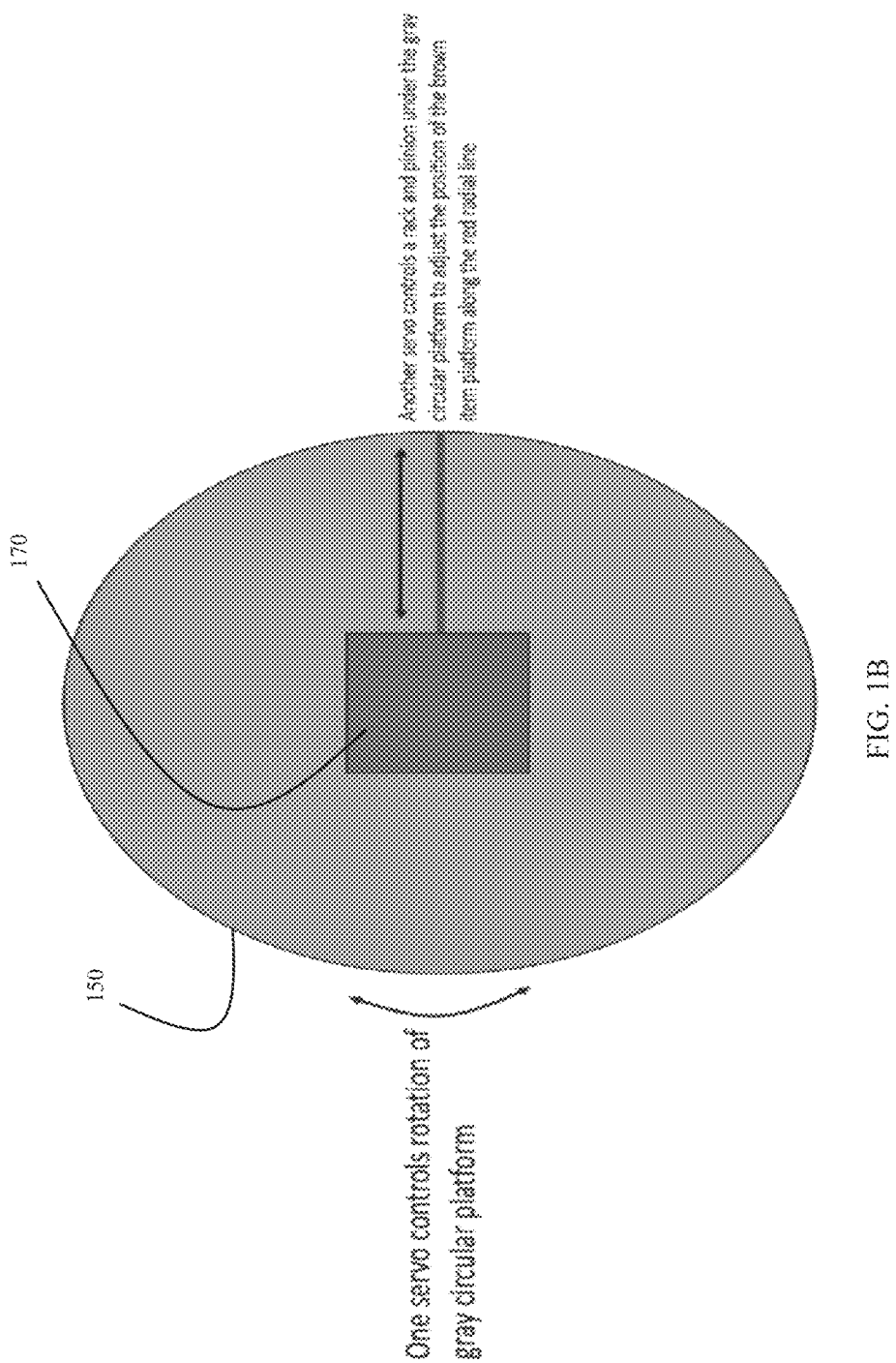
FIG. 1B is a diagram of a rotating platform portion of an apparatus for automated image capture and registration, according to an example embodiment.

FIG. 1A illustrates a spiral component of apparatus 130 (shown in FIGS. 1A and 1B). The spiral component 150 comprises a spiral platform or base that is flat and allows an item to be placed in the center in a desired position, standing up, upside down, lying on a side, etc. One of the main drawbacks with manual image data collection is the need to rotate the object/item in place so each camera 120 gets a full view of the object/item (herein after the terms item and object may be used interchangeably and synonymously). Apparatus 130 remedies this situation by using a rotating platform with the item placed at the center, driven by a programmatically controlled servo motor. Moving the item from one pair of X-Y coordinate pair within the scan zone to a different coordinate pair is addressed by the motor and programmatic controlled tracks for apparatus 130 (discussed below with FIG. 1B). The item sits on the platform of spiral component 130 and the spiral component 150 is linearly moved about the X-Y coordinate pairs of the scan zone by the tracks of apparatus 130 from center to the edges and along the edges of the scan zone.

Figure 1C:
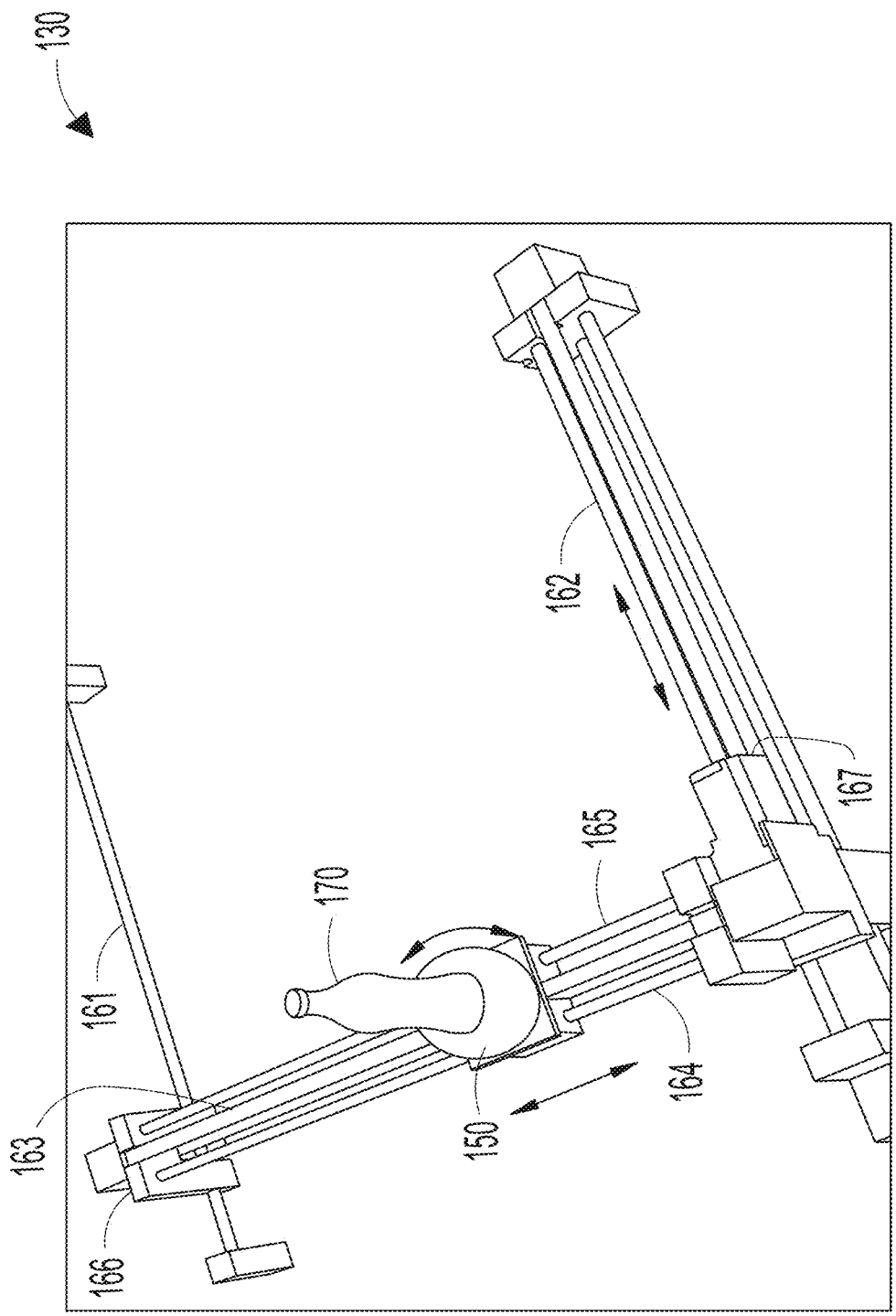
FIG. 1C is a diagram of an apparatus for automated image capture and registration, according to an example embodiment.

FIG. 1C shows the electromechanical components of apparatus 130. The apparatus 130 comprises the spiral component 150 affixed to a pin that snaps into a bottom side of spiral component and is programmatically driven to rotate 360 degrees by a servo motor. The servo motor sits along a first vertical track 163 driven by a rack and pinion mechanism to move the spiral component 150 toward and away from each vertical track end 166 and 167. The ends 166 and 167 of the vertical track 163 are affixed to the horizontal tracks 161 and 162 to programmatically drive the vertical track 163 along the length of each end of each horizontal tracks 161 and 162 towards and away from opposing ends of each horizontal vertical track 161 and 162. The vertical track 163 may comprise to additional side tracks 164 and 165 that. A rack and pinion system can be used to convert the rotation of the servo motor into the lineal movement of the vertical track 162 towards and away from the ends 166 and 167 of the vertical track 162.

The vertical track 163 and the horizontal tracks 161 and 162 create a monolithic X-Y coordinate mapping of the scan zone. That is each horizontal track 161 and 162 is situated at the edges of the scan zone and the vertical track 163 is sized to connect from a first end of a first horizontal track 161 to an opposing end of a second horizontal track 162. The movement of the vertical track 163 along the vertical track 163 itself and linearly along the first horizontal track 161 and the second horizontal track 162 permits the entire X-Y coordinates in the scan zone to be covered by any given item placed on the center of the platform of spiral component 150. Additionally, spiral component 150 when stopped at a given X-Y coordinate pair rotates 360 degrees.

In an embodiment, the motor on the vertical track 163 is mounted perpendicular to another mother mounted on one of the two vertical tracks 161 or 162 (note each vertical track 161 and 162 does not require its own motor). This provides a better X-Y table grid than alternative counterparts in the industry because other X-Y table apparatuses required a very high degree of X-Y coordinate precision. Apparatus 130 provides a way to move items in a snake-like pattern across the scan zone without human intervention. This snake-like travel pattern allows the data collection process to be consistent with each item for which images are being captured. The placement region is the platform (top flat surface) of the spiral component 150, the platform rotates to capture different angles of the items at each X-Y coordinate pair within the scan zone. This also provides more captured data for the items and combinations from different camera angles, which are vital to MLM training on item images.

During operation, a training image session is established by remote-control manager 113 and/or remote-control manager 143 with scan zone positioning agent 133 and rotation agent 134. A given item is registered with its item code via item registration interface 114 using cloud API 144. Image metadata generator maintains metadata for all images of the session for each item image captured by each of the cameras 120. Remote control manager 113 and/or 143 then initiates a script that sends instructions to scan zone positioning agent 133 and rotation agent 134 to move and rotate the item along predefined X-Y coordinates, all X-Y coordinates, or in a predefined pattern of X-Y coordinates. Each time the item is moved by apparatus 130 to a new X-Y coordinate, the cameras 120 are activated to capture the images of the item in the scan zone. The item remains in the X-Y coordinate position within the scan zone while rotation agent 134 rotates the item on the spiral component's platform and the cameras are activated to capture the images of the item in the scan zone at each rotated position. Once a predefined number of rotations and a predefined distance per rotation occurs, scan zone position agent 133 linearly relocates the item on the apparatus 130 to a next X-Y coordinate associated with the instructions provided by the remote-control manager 113 and/or 143.

This continues until all patterns defined in the instructions or all X-Y coordinates are reached for the item and rotated by the rotation agent 134. Predefined scripts or sets of instructions may be selected and sent by remote-control manager 113 and/or 143 to agents 133 and 134, such that this is a completely automated operation. Image metadata generator 115 associates each image with the registered item along with its X-Y coordinate, its camera 120 that captured the corresponding image, and a degree of rotation captured in the corresponding image. This metadata is linked to each image captured, such that should an image be of poor quality from a given camera 120 or a given set of cameras 120, the item can be positioned at the X-Y location within the scan zone, rotated to the degree defined in the metadata and the camera 120 or given set of cameras 120 can capture a new image or a new set of images. In this way, precise item training images can be captured when needed. The predefined scripts or sets of instructions may include predefined intervals of time between a time that the item reaches a destination X-Y coordinate within the scan zone and when the item is moved to a next X-Y coordinate. This interval of time allows for the rotation agent to rotate the item at the current X-Y coordinate for its instructions (by degree or degrees in configured distances) and have the images captured for each rotation before the item is moved to the next X-Y coordinate.

In an embodiment, images for items for training MLMs can also be captured "in the wild" in addition to the apparatus-based approach discussed above. Here, cameras 120 capture the item images within the scan zone during a checkout by a customer where the item barcodes are being scanned for item recognition and checkout. The unknown items are labeled in the images by checkout session image manager 116 and when an item barcode is known that item barcode is assigned to the corresponding unknown item label by manager 116. That is, each of the unknown item labels are labeled with item codes following the barcode scanning transaction. The labeled item images are stored for training MLMs on item recognition.

In an embodiment, both the apparatus-based item image capture technique and the "in the wild" item image capture technique are used to assemble a large store of item images for use in MLM item recognition.

One now appreciates how item image capture for item MLM recognition can be trained in automated manners without human intervention and/or by monitoring normal checkouts at a store. This substantially improves the item image capture quality, the number of images per item, the variation of per item image, and therefore dramatically improves the training of the MLM and thus an accuracy of the MLM is predicting item codes from images.

In an embodiment, the designated area/transaction area/scan zone of the scene is 12 inches by 16 inches or roughly corresponds to the size of a cart, a food tray, a basket or a countertop at a convenience store or transaction terminal of a store.

These embodiments and other embodiments are now discussed with reference to FIG. 2.

Figure 2:
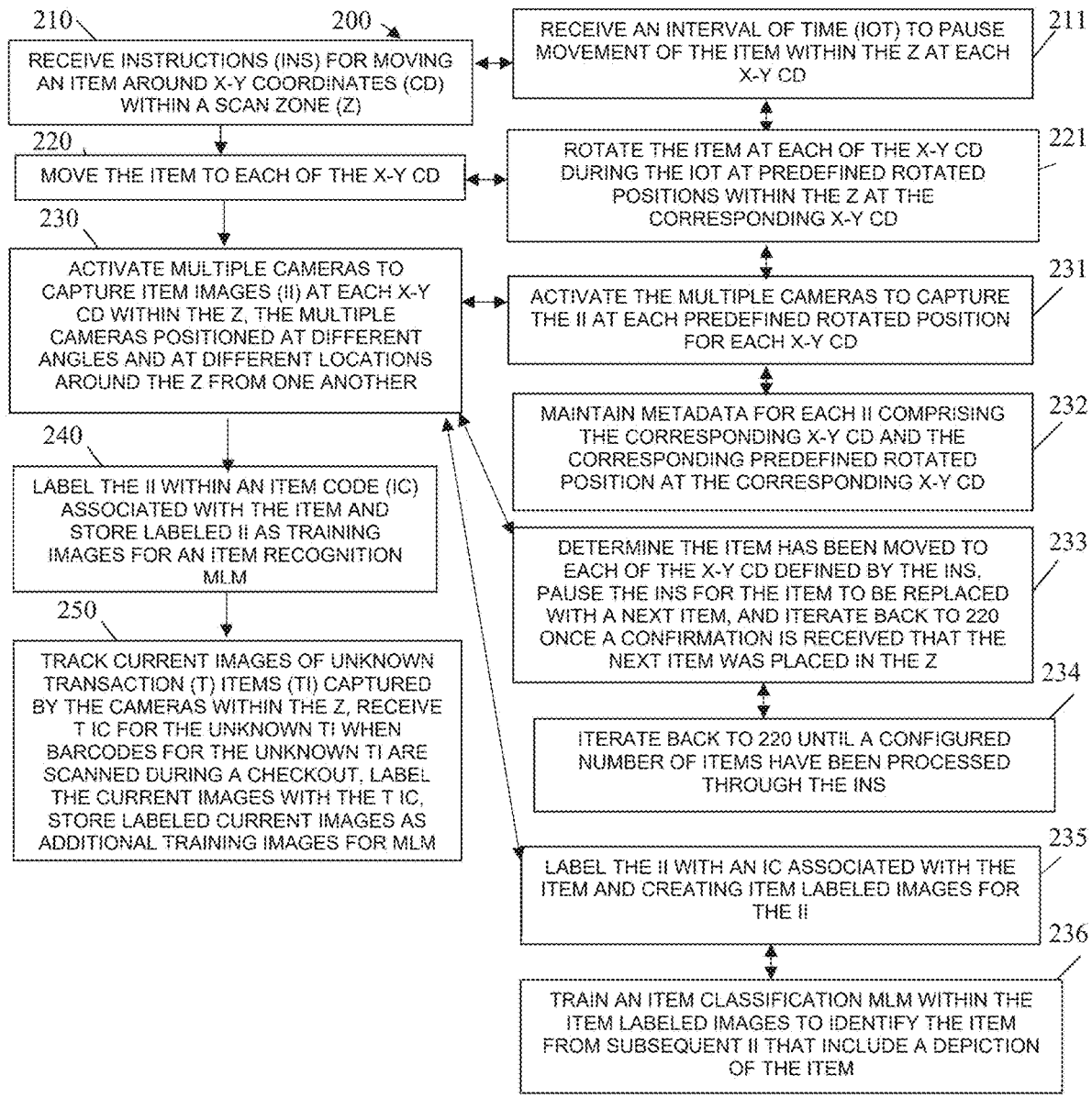
FIG. 2 is a diagram of a method of automated item image capture and registration for vision checkouts, according to an example embodiment.

FIG. 2 is a diagram of a method 200 for of automated item image capture and registration for vision checkouts, according to an example embodiment. The software module(s) that implements the method 200 is referred to as an "automated item training image collector." The automated item training image collector is implemented as executable instructions programmed and residing within memory and/or a non-transitory computer-readable (processor-readable) storage medium and executed by one or more processors of a device. The processor(s) of the device that executes the automated item training image collector are specifically configured and programmed to process the automated item training image collector. The automated item training image collector has access to one or more network connections during its processing. The network connections can be wired, wireless, or a combination of wired and wireless.

In an embodiment, the automated item training image collector executes on cloud 110. In an embodiment, the automated item training image collector on server 110. In an embodiment, the automated item training image collector executes on a retail server 140 or a user-operated device 140. In an embodiment, the automated item training image collector executes on apparatus 130.

In an embodiment, the scene item identifier is all or some combination of 113, 114, 115, 116, 117, 133, 134, 143, and/or 144.

At 210, the automated item training image collector receives instructions for moving an item around X-Y coordinates within a scan zone/transaction area.

In an embodiment, at 211, the automated item training image collector receives an interval of time to pause movement of the item within the scan zone at each X-Y coordinate with the instructions.

At 220, the automated item training image collector moves the item to each of the X-Y coordinates using the instructions and apparatus 130.

In an embodiment of 211 and 220, at 221, the automated item training image collector rotates the item at each of the X-Y coordinates during the Interval of Time at predefined rotated positions within the scan zone at the corresponding X-Y coordinate.

At 230, the automated item training image collector activates multiple cameras to capture item images at each X-Y coordinate within the scan zone. The multiple cameras 120 are positioned at different angles and at different locations around the scan zone from one another.

In an embodiment of 221 and 230, at 231, the automated item training image collector activates the multiple cameras 120 to capture the item images at each predefined rotated position for each X-Y coordinate.

In an embodiment of 231 and at 232, the automated item training image collector maintains metadata for each item image. The metadata comprises the corresponding X-Y coordinate and the corresponding predefined rotated position at the corresponding X-Y coordinate.

In an embodiment, at 233, the automated item training image collector determines the item has been moved to each of the X-Y coordinates defined by the instructions. The automated item training image collector pauses the instructions for the item to be replaced with a next item and iterates back to 220 once a confirmation is received that the next item was placed in the scan zone.

In an embodiment of 233 and at 234, the automated item training image collector iterates back to 220 until a configured number of unique items have been processed through the instructions.

In an embodiment, at 235, the automated item training image collector labels the item images with an item code associated with the item and creates item labeled item images for the item images.

In an embodiment of 235 and at 236, the automated item training image collector trains an item classification MLM with the item labeled images to identify the item from subsequent item images of the scan zone that include a depiction of at least some portion of the item.

In an embodiment, at 240, the automated item training image collector labels the item images with an item code associated with the item and stores labeled item images as training images for an item recognition MLM.

In an embodiment of 240 and at 250, the automated item training image collector tracks current images of unknown transaction items captured by the cameras 120 within the scan zone. The automated item training image collector receives transaction item codes for the unknown transaction items when barcodes for the unknown transaction items are scanned during a checkout for the transaction items. The automated item training image collector labels the current images with the transaction item codes and stores labeled current images as additional training images for the item recognition MLM.

It should be appreciated that where software is described in a particular form (such as a component or module) this is merely to aid understanding and is not intended to limit how software that implements those functions may be architected or structured. For example, modules are illustrated as separate modules, but may be implemented as homogenous code, as individual components, some, but not all of these modules may be combined, or the functions may be implemented in software structured in any other convenient manner.

Furthermore, although the software modules are illustrated as executing on one piece of hardware, the software may be distributed over multiple processors or in any other convenient manner.

The above description is illustrative, and not restrictive. Many other embodiments will be apparent to those of skill in the art upon reviewing the above description. The scope of embodiments should therefore be determined with reference to the appended claims, along with the full scope of equivalents to which such claims are entitled.

In the foregoing description of the embodiments, various features are grouped together in a single embodiment for the purpose of streamlining the disclosure. This method of disclosure is not to be interpreted as reflecting that the claimed embodiments have more features than are expressly recited in each claim. Rather, as the following claims reflect, inventive subject matter lies in less than all features of a single disclosed embodiment. Thus, the following claims are hereby incorporated into the Description of the Embodiments, with each claim standing on its own as a separate exemplary embodiment.

The invention claimed is:

1. A method, comprising:
    receiving instructions for moving an item around X-Y coordinates within a scan zone;
    moving the item to each of the X-Y coordinates based on the instructions using a spiral platform that rotates the item 360 degrees at each X-Y coordinate and linearly moves the spiral platform along a vertical track that moves along two horizontal tracks to cover an entirety of the X-Y coordinates within the scan zone;
    activate multiple cameras to capture item images of the item at each X-Y coordinate within the scan zone, wherein the multiple cameras are positioned at different angles and at different locations around the scan zone from one another.

2. The method of claim 1 further comprising, labeling the item images with an item code associated with the item and storing labeled item images as training images for an item recognition Machine-Learning Model (MLM).

3. The method of claim 2 further comprising, tracking current images of unknown transaction items captured by the multiple cameras within the scan zone, receiving transaction item codes for the unknown transaction items when barcodes for the unknown transaction items are scanned during a checkout, labeling the current images with the transaction item codes, and storing labeled current images as additional training images for the item recognition MLM.

4. The method of claim 1, wherein receiving further includes identifying an interval of time to pause movement of the item within the scan zone at each X-Y coordinate.

5. The method of claim 4, wherein moving further includes rotating the item at each of the X-Y coordinates during the interval of time at predefined rotated positions within the scan zone at a corresponding X-Y coordinate.

6. The method of claim 5, wherein activating further includes activating the multiple cameras to capture the item images at each predefined rotated position for each X-Y coordinate.

7. The method of claim 6, wherein activating further includes maintaining metadata for each item image comprising a corresponding X-Y coordinate and a corresponding predefined rotated position at the corresponding X-Y coordinate.

8. The method of claim 1, wherein activating further includes determining the item has been moved to each of the X-Y coordinates defined by the instructions, pausing the instructions for the item to be replaced with a next item, and iterating back to the moving once a confirmation is received that the next item was placed in the scan zone.

9. The method of claim 8 further comprising, iterating back to the moving until a configured number of items have been processed through the instructions.

10. The method of claim 1, wherein activating further includes labeling the item images with an item code associated with the item to create item labeled images for the item images.

11. The method of claim 10 further comprising, training an item classification Machine-Learning Model (MLM) with the item labeled images to identify the item from subsequent item images that include a depiction of the item.

12. An apparatus, comprising:
    a vertical track comprising a spiral platform adapted to receive or hold an item placed on the spiral platform, wherein the vertical track and horizontal tracks create a monolithic X-Y coordinate mapping of a scan zone such that each horizontal track is situated at edges of the scan zone and the vertical track is sized to connect from a first end of a first horizontal track to an opposing end of a second horizontal track;
    two horizontal tracks adapted to connect to each end of the vertical track;
    a processor and a non-transitory computer-readable storage medium comprising executable instructions;

the executable instructions when executed by the processor from the non-transitory computer-readable storage medium cause the processor to perform operations comprising:

receiving instructions to move the item placed on the spiral platform to X-Y coordinates within the scan zone by urging the spiral platform linearly along the vertical track and by urging the vertical track along the two horizontal tracks to each corresponding X-Y coordinate defined in the instructions; and rotating the spiral platform by predefined distances at each X-Y coordinate for a predefined number of rotations defined by the instructions; and pausing movement of the spiral platform after each rotation at each X-Y coordinate to permit multiple cameras to capture images of the item within the scan zone.

13. The apparatus of claim 12, wherein the spiral platform is adapted to be moved by the operations to all of the X-Y coordinates defined within the scan zone.

14. The apparatus of claim 12 further comprising:
a servo motor mounted on the vertical track under the spiral platform; and
a rack and pinion mechanism to convert rotating motion of the servo motor into linear motion of the spiral platform along the vertical track.

15. The apparatus of claim 14 further comprising:
two motors mounted on at least one of the two horizontal tracks, wherein a first motor is adapted to generate first horizontal linear motion along the two horizontal tracks and a second motor is adapted to generate second independent vertical linear motion along the vertical track.

16. The apparatus of claim 15, the two motors are mounted perpendicular to one another.

17. The apparatus of claim 12, wherein the operations associated with receiving further includes receiving the instructions over a wired or wireless connection from a user-operated device.

18. The apparatus of claim 12, wherein the operations associated with pausing further includes activating the multiple cameras during each pause and deactivating the multiple cameras after each pause.

19. A system, comprising:
an apparatus adapted to hold an item on a platform, move the item on the platform to X-Y coordinates defined for a scan zone, and rotate the item on the platform at each X-Y coordinate, wherein the apparatus moves the item in a snake-like pattern across the scan zone without human intervention providing a snake-like travel pattern that allows a data collection process to be consistent with each item for which images are being captured;

cameras adapted to take images of the item within the scan zone at each X-Y coordinate and during each rotation of the item on the platform;

a device comprising at least one processor and a non-transitory computer-readable storage medium;

the non-transitory computer-readable storage medium comprises executable instructions; and the executable instructions when executed by the at least one processor from the non-transitory computer-readable storage medium cause the at least one processor to perform operations comprising:

controlling movement of the item on the platform to the X-Y coordinates and rotations of the item on the platform through the apparatus;

activating and deactivating the cameras to capture the images;

labeling the images with an item code registered for the item creating labeled item images; and using the labeled item images to train an item recognition Machine-Learning Model (MLM) to identify the item code from subsequent images captured of the scan zone by the cameras.

20. The system of claim 19, wherein the cameras are affixed to a basket, or a cart carried by a customer or wherein the cameras are affixed to or surround a countertop associated with a transaction terminal where the customer is performing a transaction.

* * * * *